United States Patent Office 2,704,774
Patented Mar. 22, 1955

2,704,774

MANUFACTURE OF 2,4,4-TRIMETHYLPENTANOL

Edward James Gasson, Banstead, Anthony Musgrave Wild, Cheam, Ian Kenneth Miles Robson, London, and Alfred Frank Millidge, Coulsdon, England, assignors to The Distillers Company Limited, Edinburgh, Scotland, a British company No Drawing. Application January 10, 1951, Serial No. 205,428

Claims priority, application Great Britain January 20, 1950

6 Claims. (Cl. 260—638)

The present invention relates to the manufacture of primary alcohols from epoxides of the structure

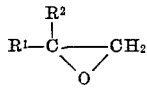

in which $R^1$ and $R^2$ are alkyl, aryl or alicyclic radicals.

According to U. S. Patent No. 1,953,548, normal propyl alcohol is produced by passing propylene oxide vapour and hydrogen successively through two catalyst chambers, the first of which contains a catalyst such as alumina and is maintained at temperatures between 250° and 400° C. and the second nickel or other hydrogenation catalysts at a temperature of 125° to 170° C. The process described in said patent is conducted in such a manner that the final reaction mixture contains a major proportion of unchanged propylene oxide. The reason for leaving almost half of the epoxide unreacted may be found in the U. S. Patent No. 1,917,179 of the same inventors, which was filed prior to that previously mentioned. In this patent it is stated that when propylene oxide is permitted to remain too long in the reaction tube containing aluminum oxide at temperatures between 200 and 400° C. changes and decompositions may occur which result in the loss of valuable material.

When compounds of the above given structure, hereinafter called "epoxides" are treated, bearing in mind the warning given in the earlier patent, according to the known process of U. S. Patent 1,953,548, in such a way that part of the epoxide remained unchanged, a considerable proportion of the epoxide consumed is converted into hydrocarbon so that the yields of the desired alcohol are rather poor.

The principal object of the invention accordingly is to provide a simple, efficient process for the manufacture of primary alcohols from epoxides of the type mentioned above, which shall do away with at least some of the disadvantages of the prior processes and particularly shall give improved yields.

The invention comprises the novel processes and steps of processes, specific embodiments of which are described hereinafter by way of example and in accordance with which we now prefer to practice the invention.

It has now been found in accordance with our invention that the conversion of epoxides as defined to the primary alcohols is achieved with practically quantitative yield by passing epoxide vapours at reaction temperatures over an isomerisation catalyst until substantially complete conversion of the epoxide into the corresponding aldehyde has taken place and subsequently passing the reaction mixture resulting from the isomerisation step, with or without previous condensation of the aldehyde to the liquid state, in association with hydrogen, over a hydrogenation catalyst. By substantially complete conversion is meant a conversion of the epoxide into the corresponding aldehyde to such a degree that the vapours leaving the isomerisation reaction chamber do not contain more than 5% of the initial amount of epoxide. Preferably, the epoxide is subjected to the isomerisation in the presence of inert gases or vapours.

Epoxides of the defined kind which can be treated with special advantage according to the process of the present invention and converted thereby into the corresponding primary alcohols are, for instance isobutene oxide, di-isobutene oxide (1:2-epoxy-2:4:-trimethylpentane) which is converted into 2:4:4-trimethylpentan-1-ol and alpha-methylstyrene oxide which is converted into 2-phenyl-propan-1-ol, furthermore the oxides of tertiary delta-1-olefine polymers of propylene or butylene, such as propylene dimer, mixed delta-1-dimer of n-butene and iso-butene, delta-1-tri-isobutene, vinyl naphthalene and 2:3:4-trimethyl pentene-1.

In the following the process of the present invention will be described by the treatment of 1:2-epoxy-2:4:4-trimethylpentane and its conversion into 2:4:4-trimethyl-pentan-1-ol, but it is to be understood that the present invention is not restricted to this particular epoxide.

The preferred catalyst for the isomerization step is alumina especially activated alumina but other isomerising catalysts such as silica gel and phosphoric acid, on suitable carriers, may also be used. The range of temperatures at which the isomerisation step may with advantage be carried out is from 200 to 350° C. and the contact time necessary for achieving substantially complete conversion of the epoxide into the aldehyde depends in a certain measure upon the temperature used and also upon the nature of the catalyst. The actual time required may be determined without difficulty by preliminary experiment.

An inert gas, such as nitrogen or carbon dioxide, may be used as diluent for the epoxide. It is preferred, however, to employ hydrogen, since hydrogen has to be used for the subsequent hydrogenation step. Owing to the exothermic nature of the isomerisation reaction a peak temperature tends to develop in the catalyst bed and it is an additional feature of this invention to control and adjust this reaction temperature by the addition of regulated amounts of the diluting gas. Preferably, the amount of the diluent gas should be such that the temperature in the catalyst bed is maintained at, and does not substantially exceed, 350° C.

For the hydrogenation step the use of a copper catalyst is preferred and this is advantageously prepared by precipitating copper compounds on suitable carriers such as magnesia, silica gel, kieselguhr, and a subsequent reduction treatment. The preferred temperature for the hydrogenation with the said copper catalyst is between 180 and 350° C. and the contact time of the gaseous mixture with the catalyst should not be longer than that required for the conversion of a major part of the isomerised material into alcohol. If the diluent gas for the isomerisation step was not hydrogen but, for instance, nitrogen or any other inert gas, hydrogen has to be added before the gaseous mixture is introduced into the hydrogenation reactor. In order not to dilute the reaction mixture unnecessarily it is advantageous, however, to add hydrogen at the beginning and use it as diluting gas as well as hydrogenating gas.

For the isomerisation in the presence of hydrogen, mild steel may be used as material for the reactor.

When pure epoxide has been used as a starting material for the reaction the final product resulting from the isomerisation and the hydrogenation is practically pure primary alcohol. If the hydrogenation of the second stage is not quite complete the unchanged aldehyde may be separated from the alcohol by fractionation and recycled either to the first or preferably to the second stage of the process.

The epoxide used for the present invention may be prepared according to the processes described in our copending application Serial No. 149,642 filed March 14, 1950, now abandoned, according to which olefines, such as di-isobutene, may be oxidised in the liquid phase by means of molecular oxygen whereby the epoxide is formed, which is then recovered from the oxidation reaction mixture.

Instead of using the isolated epoxide, however, the crude reaction mixture resulting from this oxidation process may be used with advantage for the process of the present invention. The reaction mixture contains not only the epoxide but also ketones, e. g. in the case of di-isobutene, methyl neo-pentyl ketone. When the crude oxidate after the removal of unchanged olefine is treated according to the present invention the methyl neopentyl ketone appears largely unchanged in the reaction mixture leaving the second catalyst and can then be easily separated from the alcohol by fractionation and thus recovered. This is rather surprising in view of the case with which ketones and aldehydes generally react with each other and with themselves in the presence of, for instance, alumina, which usually promotes condensation reactions.

The use of copper catalysts under the above conditions has, as has been found, the advantage that the original olefine as well as the ketone which results from the isomerisation of the corresponding beta-olefine epoxide, remain practically unchanged. Thus, e. g. in the case of di-isobutylene, it is not necessary to strip the crude oxidation mixture wholly from unchanged di-isobutylene before isomerisation and/or hydrogenation, and with regard to the ketone, the resulting alcohol is practically free from the corresponding secondary alcohol. On the other hand, it is desirable not to prolong the contact time of the gases over the hydrogenation catalyst beyond the time required for practically complete hydrogenation of the aldehyde, and the conversion thereby into the alcohol and in order to make sure of this, it is preferable to stop the hydrogenation before all the aldehyde is hydrogenated, as otherwise the accompanying olefine is attacked.

It is a further feature of this invention to recycle the hydrogen either in part or wholly. On recycling the hydrogen the re-introduction may be effected either to the gas mixture before it enters the isomerisation reactor or to the gas mixture entering the hydrogenation reactor or to both. In these circumstances, the hydrogenation may be carried out with a considerable excess of hydrogen, for instance 5–10 fold, which also allows the isomerisation step to be well-controlled even when large catalyst beds are employed.

The following examples serve to illustrate the manner in which the process of the invention may be carried out:

Example 1

100 parts by weight of a distilled fraction containing 88% of 1:2-epoxy-2:4:4-trimethyl pentane was passed with 11% by volume (calculated on the vapours) of nitrogen over granular activated alumina maintained at about 320° C., the said rate being 305 grams per hour per litre of catalyst space. 99 parts by weight of a reaction product was obtained which contained 87.8% of 2:4:4-trimethyl pentanal and no epoxide which corresponds to 99% of the theoretical yield. This product was passed after 6 moles hydrogen per mole of aldehyde had been added thereto over a catalyst comprising copper supported on kieselguhr which was maintained at 220° C. 97 parts by weight of a product was obtained which contained about 90% of 2:4:4-trimethyl pentanol. This was subjected to fractional distillation and boiled at 70 to 78° C. at 15 millimetres Hg pressure.

Example 2

The reaction mixture resulting from treating di-isobutene with air at elevated temperatures in the presence of aqueous alkaline solutions was stripped of unreacted di-isobutene by distillation. 100 parts by weight of the crude product thus obtained and containing about 55% by weight of epoxide was passed with 7 moles of hydrogen per mole of the epoxide over granular activated alumina at 230–255° C., the rate being 180 grams per hour per litre of catalyst space. The crude product resulting from this step amounted to 96 parts by weight and contained 55 to 60 parts of the aldehyde. This is about 100% yield on the epoxide used. It contained less than 1% of unreacted epoxide and was passed over a copper catalyst supported on kieselguhr at 220 to 240° C. to give 92.5 parts of hydrogenated product. This product on fractionation gave 49 parts of 2:4:4-trimethyl pentanol boiling point 70 to 79° C./13 millimetres Hg together with noticeable quantities of methyl neo-pentyl ketone and methyl neo-pentyl carbinol.

Example 3

The reaction mixture resulting from treating di-isobutene in the liquid phase with air at elevated temperatures in the presence of alkali was stripped of unreacted di-isobutene by distillation. 100 parts by weight of the crude product thus obtained and containing about 58 parts by weight of epoxide was passed with 5 moles of hydrogen per mole of the crude product from the oxidation stage over activated granular alumina at a temperature of 230° C. to 250° C. at a rate of 360 volumes per hour per volume of catalyst space in a mild steel reactor.

The crude product from this step amounted to 96 parts by weight and contained 61 parts by weight of aldehyde, but no epoxide. The product was then passed with 8 moles of hydrogen per mole of product over a copper catalyst supported on kieselguhr at a temperature of 200° C.–230° C. and at a rate of 180 volumes per hour per volume of catalyst space to give 96 parts by weight of hydrogenated product containing 61 parts of 2:4:4-trimethylpentanol, boiling point 168–169° C./740 mm. together with 7 parts of methylneopentyl ketone, boiling point 124° C./740 mm. and 3 parts of methylneopentyl carbinol, boiling point 136–138° C./740 mm. Small amounts of unchanged aldehyde were recovered in a mixture with trimethylpentanol-1 (boiling between 140°–168° C.) which mixture was returned to the hydrogenation.

By substituting in these examples the epoxide used by corresponding amounts of the olefine oxides enumerated above the primary alcohols of said compounds were obtained in good yields.

Similarly the alumina used for the isomerisation stage may be replaced by corresponding amounts of silica gel or phosphoric acid upon for instance kieselguhr as support.

We claim:
1. A process which comprises passing 1:2-epoxy-2:4:4-trimethyl-pentane in the vapour phase over an alumina isomerization catalyst and subsequently conducting the mixture resulting from the isomerization reaction over a copper hydrogenation catalyst with hydrogen to hydrogenate the corresponding trimethyl pentanal to form 2:4:4-trimethyl-pentanol.

2. Process according to claim 1, which comprises maintaining the temperature in the isomerisation reaction zone between 200° and 350° C.

3. Process as claimed in claim 1, wherein the isomerisation is effected in the presence in the isomerisation reaction zone of an inert gas.

4. Process as claimed in claim 3, wherein hydrogen is employed as inert gas.

5. Process as claimed in claim 3, wherein the amount of the inert gas is adjusted so that the temperature in the isomerisation reaction zone is regulated thereby.

6. Process for the manufacture of 2:4:4-trimethyl-pentan-1-ol which comprises passing 1:2-epoxy-2:4:4-trimethylpentane in the vapour phase over an alumina isomerisation catalyst with nitrogen at about 320° C. until substantially complete conversion to 2:4:4-trimethylpentanal has taken place and subsequently conducting the resulting gaseous reaction mixture in association with hydrogen over a copper hydrogenation catalyst at about 220° C.

References Cited in the file of this patent

UNITED STATES PATENTS

| | | |
|---|---|---|
| 1,684,640 | Schmidt et al. | Sept. 18, 1928 |
| 1,917,179 | Young et al. | July 4, 1933 |
| 1,953,548 | Young et al. | Apr. 3, 1934 |
| 2,159,507 | Law et al. | May 23, 1939 |
| 2,503,050 | Jacobs et al. | Apr. 4, 1950 |
| 2,521,170 | Jacobs et al. | Sept. 5, 1950 |
| 2,601,538 | Lundsted | June 24, 1952 |

OTHER REFERENCES

Byers et al.: Journal of the Chemical Soc., London, 1948, part II, pages 1328 and 1334 to 1336.